July 20, 1965  D. E. RUNKLE  3,195,570
HYDRAULIC CENTERING DEVICE
Filed May 29, 1963
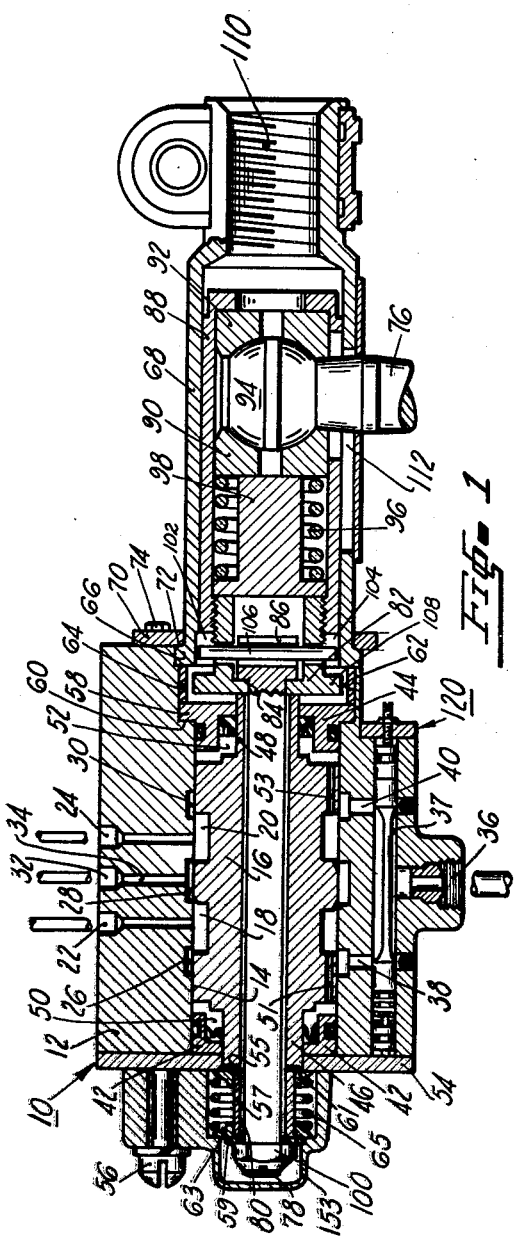
INVENTOR.
*DEAN E. RUNKLE*
BY
*William N. Antonis*
ATTORNEY United States Patent Office 3,195,570
Patented July 20, 1965

3,195,570
HYDRAULIC CENTERING DEVICE
Dean E. Runkle, South Bend, Ind., assignor to The Bendix Corporation, South Bend, Ind., a corporation of Delaware
Filed May 29, 1963, Ser. No. 284,201
3 Claims. (Cl. 137—596)

This invention relates to hydraulic power steering and more particularly to means for hydraulically centering a power steering control valve.

Experience has shown that due to normal manufacturing tolerances, it is almost impossible to accurately locate a valve spool in its housing so that there will be no differential in pressure between the two cylinder ports when the spool is mechanically located in its center or straight ahead driving position.

Accordingly, it is an object of this invention to provide a device which will, for the straight ahead driving position, balance the pressures at the cylinder ports regardless of variations in manufacturing tolerances.

Another object of this invention is to provide a device which, if desired, can, for the straight ahead driving position, be adjusted so as to create a predetermined differential in cylinder port pressures so as to balance the forces exerted by a power cylinder having differential piston areas.

A further object of this invention is to provide a device which will adjust the pressures at the cylinder ports without varying the inlet pressure.

More particularly, it is an object of this invention to provide, in connection with an open center spool type valve, inlet orifice areas interposed between the inlet pressure port and the land orifice areas formed by the associated lands of the spool and housing, which inlet orifice areas are varied by a centering plunger in order to offset the manufacturing tolerances affecting the land orifice areas.

The above and other objects and features of the invention will become apparent from the following description of the device taken in connection with the accompanying drawing which forms a part of this specification and in which:

FIGURE 1 is a sectional view of an open center power steering valve incorporating my invention; and FIGURE 2 is an enlarged fragmentary sectional view of the valve shown in FIGURE 1.

Referring to FIGURE 1 of the drawings, numeral 10 designates a control valve comprising a housing member 12 having a bore 14 therein. A valve member 16 lies within the bore 14 and is movable in opposite directions from a normally neutral or center position, thereby controlling flow in the hydraulic system. The valve member 16 is formed with two annular channels 18 and 20 which communicate with cylinder ports 22 and 24 respectively. The bore 14 of the housing is provided with annular channels 26, 28 and 30. Annular channel 28 is in communication with a return port 32 by way of passage 34. Annular channels 26 and 30 communicate with an inlet port 36 through passages 37, 38 and 40. The control valve shown in FIGURES 1 and 2 is an open center type valve which in the neutral position allows free flow of the hydraulic fluid between the inlet port 36 and the return port 32 via the annular channels 26, 18 and 28 and via the annular channels 30, 20 and 28.

Sealing bushings 42 and 44 are located at reduced ends 46 and 48 of the valve member 16 to provide reaction chambers 50 and 52. These reaction chambers are in effect hydraulic pressure reaction means built into the control valve in order to oppose movement of the valve member 16 away from its neutral position. In other words, the hydraulic pressure communicated to these chambers via passages 51 and 53 acts on the valve member tending to oppose relative movement from neutral and when such movement occurs, helps to restore the spool to its mechanical center. The spring package, which mechanically locates the spool 16 within the housing bore 14, consists of a spring 65, spring seats 61 and 63, and assorted spacers 55, 57, and 59.

Bushing 42 is retained in the bore 14 by an end cap 153 and plate 54 which engages the outer side of the bushing. Bolts 56, only one of which is shown, secure the end cap and plate to the housing member 12. The bushing 44 includes a flange 58 which engages a shoulder 60 formed in a counterbore 62 located at the end of bore 14. A spacer ring 64 is arranged in the counterbore between the flange 58 and inner end 66 of sleeve 68. A ring-like member 70 slides over the sleeve 68 for engagement with a shoulder 72 formed at the inner end 66 of the sleeve for securing the sleeve 68, spacer ring 64, and bushing 44 in assembled relationship. Bolts 74, only one of which is shown, holds the ring 70 against the end of the housing member.

The valve spool 16, which is operatively connected to a ball stud 76 for sliding movement in the bore, can be shifted by applying a force laterally on the ball stud 94 which force must overcome the preload of spring 65. The connection to the stud is an assembly of parts comprising a bolt 78 extending through a central passage 80 of the valve member, a stop bushing 82 having an opening 84 therein which passes a small diameter of the bolt but not the enlarged end 86, an inner sleeve 88 the inner end of which threadedly engages the stop bushing 82, members 90 and 92 providing sockets for a spherical end 94 of the stud, a spring 96, and a ball socket member 98. With nut 100 tightened down against the end 46 of the valve member, movement of the ball stud will cause the valve member and assembly to move as a unit in the housing member 12 and sleeve 68. The inner end of the sleeve 68 is slotted at 102 and 104 to receive the ends of pin 106 thereby preventing rotation of the assembly in the bore. The pin 106 passes through the stop bushing 82 and enlarged end 86 of the bolt 78 in order to prevent the latter from turning when the nut 100 is applied thereto. The bushing 82 has a collar 108 to aid in assembly.

Note that the stop bushing 82 has a radially extending flange 108 which engages the inner end 66 of the sleeve 68 when the valve member is moved to the right, as viewed in FIGURE 1, and the outer side of sealing bushing 44 when the valve member is moved to the left. This positive engagement between the stop bushing 82 and the sleeve 68 after a predetermined movement of the valve member permits manual steering in the event of power failure. The end of sleeve 68 is threaded at 110 so that it may be connected to the end of a cross tie rod (not shown). The sidewall of the sleeve 68 is provided with an axially extending opening 112 to permit movement of the ball stud as explained above.

The invention claimed herein concerns the use of a mechanism 120 located in the housing member for controlling the pressure differential at the cylinder ports 22 and 24. More particularly, referring to FIGURE 2, it will be seen that the mechanism 120 includes a centering plunger 122 which is slidable in a bore 124. Movement of the plunger will occur upon rotation of threaded member 126, said movement being opposed by a spring 128 which abuts a stop member 130. The bore 124, which intersects passages 38 and 40, forms orifices 132 and 134 therewith, the effective areas of which may be varied by lands 136 and 138 formed on the centering plunger 122. Thus, orifice 132 is interposed in the passage between inlet port 36 and annular inlet channel 26, while orifice 134 is interposed in the passage between inlet port 36 and annular inlet channel 30. If the centering plunger 122 is caused to move towards the left by rotation of threaded member 126, the effective area of orifice 132 will increase, while the effective area of orifice 134 will simultaneously correspondingly decrease. If the centering plunger 122 is caused to move towards the right, the reverse would be true. As previously stated, due to manufacturing tolerances, it is almost impossible to accurately locate and mechanically center the valve spool in the valve housing bore so as to insure that the proper differential pressure will exist at the cylinder ports 22 and 24 for the normally neutral or straight ahead driving position. Accordingly, through means of the mechanism described, it is possible to simultaneously vary the effective areas of orifices 132 and 134 so as to offset variations in the effective areas of orifices a, b, c and/or d which may arise because of manufacturing tolerances, and thereby change within a limited range the differential cylinder port pressure to a desired value without any increase or decrease in the inlet pressure.

The several practical advantages which flow from my invention are believed to be obvious from the above, and other advantages may suggest themselves to those who are familiar with the art to which this invention relates.

Although this invention has been described in connection with a specific embodiment, it will be obvious to those skilled in the art that various changes may be made in the form, structure and arrangement of parts without departing from the spirit of the invention. Accordingly, I do not desire to be limited to the specific embodiment disclosed herein, primarily for purposes of illustration, but instead desire protection falling within the scope of the appended claims.

Having thus described the various features of the invention, what I claim as new and desire to secure by Letters Patent is:

1. A control valve comprising a housing member having a bore therein, a spool type valve member movable in opposite directions from a normally neutral position within said bore, an inlet port, an outlet port and two cylinder ports, first and second annular inlet channels and an annular outlet channel located therebetween formed in said bore, first passage means located in said housing member for communicating said inlet port with both of said annular inlet channels, second passage means located in said housing member for communicating said outlet port with said annular outlet channel, first and second annular cylinder channels formed on said valve member, each of which is located between one of the annular inlet channels and the annular outlet channel to permit direct fluid flow from said inlet port to said outlet port when said valve member is in said neutral position, third passage means located in said housing member for communicating one of said cylinder ports with one of the annular cylinder channels, fourth passage means located in said housing member for communicating the other of said cylinder ports with the other of said annular cylinder channels, first orifice means interposed in said first passage means for regulating the flow of fluid from said inlet port to one of said annular inlet channels, second orifice means interposed in said first passage means for regulating the flow of fluid from said inlet port to the other of said annular inlet channels, and means located in said first passage means for varying the effective areas of said first and second orifice means to control the pressure differential at said first and second cylinder ports, said means including a single manually movable centering plunger for simultaneously increasing the effective area of one of said orifices while correspondingly reducing the effective area of the other of said orifices.

2. A control valve comprising a housing member having a bore therein, a spool type valve member movable in opposite directions from a normally neutral position within said bore, three annular channels formed in said bore, two annular channels formed on said valve member, said annular channels being arranged to communicate with each other when said valve member is in said neutral position, an inlet port, an outlet port, and two cylinder ports, first passage means located in said housing member for communicating said inlet port with two of the annular channels formed in said bore, second passage means located in said housing member for communicating said outlet port with the remaining annular channel formed in said bore, third passage means located in said housing member for communicating one of said cylinder ports with one of the annular channels formed on said valve member, fourth passage means located in said housing member for communicating the other of said cylinder ports with the other of the annular channels formed on said valve member, first orifice means interposed in said first passage means for regulating the flow of fluid from said inlet port to one of the two annular channels with which the inlet port communicates, second orifice means interposed in said first passage means for regulating the flow of fluid from said inlet port to the other of the two annular channels with which the inlet port communicates, and plunger means located in said first passage means for simultaneously varying the effective areas of said first and second orifice means to control the pressure differential at said first and second cylinder ports.

3. A control valve comprising a housing member having a bore therein, a valve member movable in opposite directions from a normally neutral position within said bore, a plurality of annular channels formed in said bore and on said valve member, said annular channels including two annular inlet channels, an annular outlet channel and two annular cylinder channels which are arranged to permit continuous fluid communication between said annular inlet channels and said annular outlet channel via said annular cylinder channels when said valve member is in said neutral position, an inlet port, an outlet port and two cylinder ports, passage means located in said housing member for communicating said inlet, outlet and cylinder ports with said inlet, outlet and cylinder channels respectively, first orifice means interposed in said passage means for regulating the flow of fluid from said inlet port to one of said annular inlet channels, second orifice means interposed in said passage means for regulating the flow of fluid from said inlet port to the other of said annular inlet channels, and plunger means located in said passage means for simultaneously varying the effective areas of said first and second orifice means to control the pressure differential at said first and second cylinder ports.

References Cited by the Examiner

UNITED STATES PATENTS

| 2,241,545 | 5/41 | Ernst | 137—596.12 |
| 2,930,361 | 3/60 | MacDuff | 137—625.63 X |
| 3,095,903 | 7/63 | Jennings | 137—625.68 |

FOREIGN PATENTS 883,580   11/61   Great Britain.

M. CARY NELSON, *Primary Examiner.*